(12) United States Patent
Chang et al.

(10) Patent No.: US 9,229,519 B2
(45) Date of Patent: Jan. 5, 2016

(54) SERIAL INTERFACE TRANSMITTING METHOD AND PERIPHERAL DEVICE CHIP

(71) Applicant: NOVATEK Microelectronics Corp., Hsin-Chu (TW)

(72) Inventors: Hui-Hung Chang, Keelung (TW); Chun-Ching Huang, Hsinchu (TW); Shih-Ming Lin, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 430 days.

(21) Appl. No.: 13/677,270

(22) Filed: Nov. 14, 2012

(65) Prior Publication Data

US 2013/0246821 A1    Sep. 19, 2013

(30) Foreign Application Priority Data

Mar. 13, 2012   (TW) .............................. 101108424 A (51) Int. Cl.
*G06F 1/32* (2006.01)
(52) U.S. Cl.
CPC .............. *G06F 1/3215* (2013.01); *G06F 1/325* (2013.01)
(58) Field of Classification Search
CPC ..... G06F 1/325; G06F 1/3253; G06F 1/3215; G06F 1/3206; G06F 1/324; Y02B 50/1235; Y02B 50/12356
See application file for complete search history.

(56) References Cited

U.S. PATENT DOCUMENTS

| 6,073,244 | A | 6/2000 | Iwazaki | |
|---|---|---|---|---|
| 6,728,890 | B1 * | 4/2004 | Mirov et al. | 713/300 |
| 8,448,001 | B1 * | 5/2013 | Zhu et al. | 713/322 |
| 2003/0117176 | A1 * | 6/2003 | Tardieux et al. | 326/93 |
| 2004/0003311 | A1 * | 1/2004 | Jones | 713/320 |
| 2006/0129703 | A1 | 6/2006 | Oshikawa | |
| 2011/0010567 | A1 * | 1/2011 | Schmitz et al. | 713/300 |
| 2012/0023358 | A1 * | 1/2012 | Nakamura et al. | 713/500 |
| 2013/0212408 | A1 * | 8/2013 | Fernald | 713/300 |

FOREIGN PATENT DOCUMENTS

| CN | 1292326 C | 12/2006 |
|---|---|---|
| CN | 101605081 A | 12/2009 |
| TW | 201112002 | 4/2011 |

* cited by examiner

*Primary Examiner* — Kim Huynh
*Assistant Examiner* — Brandon Kinsey
(74) *Attorney, Agent, or Firm* — Winston Hsu; Scott Margo (57) ABSTRACT

The present invention discloses a serial interface transmitting method utilized in a serial interface for connecting between a master controller and a peripheral device. The serial interface transmitting method comprises receiving a saving power signal from the master controller, a peripheral clock source and a serial interface clock source for generating a clock source selection result, switching an operational mode of the peripheral device according to the clock source selection result, and transmitting a datum to a peripheral-device register or a serial interface register according to the saving power signal and the operational mode.

23 Claims, 9 Drawing Sheets

SERIAL INTERFACE TRANSMITTING METHOD AND PERIPHERAL DEVICE CHIP

BACKGROUND OF THE INVENTION

1. Field of the Invention

The present invention relates to a serial interface transmitting method, and more particularly, to a serial interface transmitting method which switches between a saving power mode and a normal mode.

2. Description of the Prior Art

People are surrounded by more and more mobile devices, such as smart phones, personal digital assistances (PDA) or tablet computers. To conveniently manage stored digital files inside the above mobile devices, or to share the digital files between the mobile devices or to backup the digital files, users connect the mobile devices to a personal computer to set up an electrical system.

Figure 1:
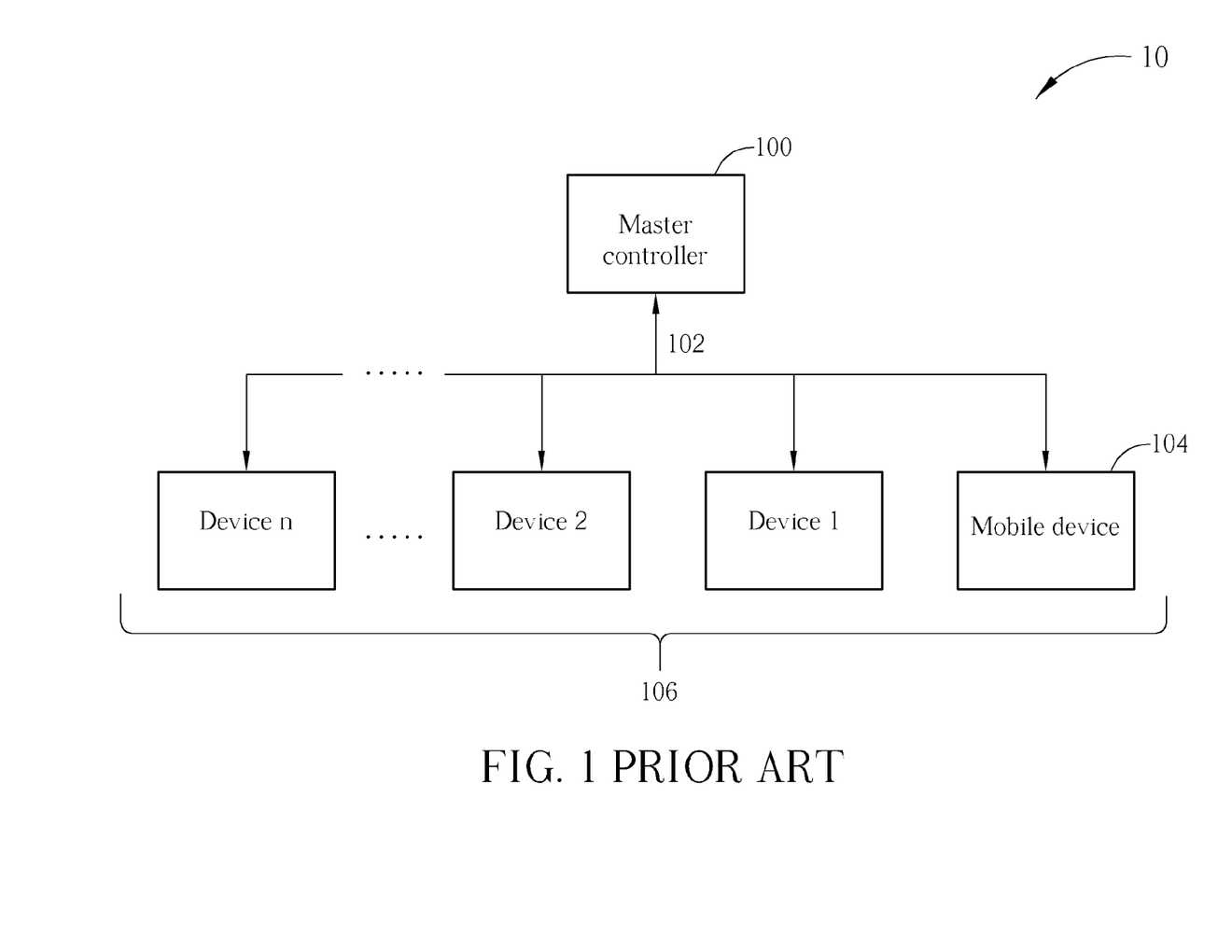
FIG. 1 illustrates a conventional schematic diagram of an electrical system.

Please refer to FIG. 1, which illustrates a conventional schematic diagram of an electrical system 10. As shown in FIG. 1, the electrical system 10 is utilized to provide the mobile device 104 with an operation of data transmission or data backup via a bus 102 and a master controller 100, so as to set up a personal digital database. Additionally, the master controller 100 is utilized as a control center to regard the mobile devices 1-n as peripheral devices 106 when the mobile devices 1-n are coupled to the master controller 100. Under such circumstances, the master controller 100 cannot only directly control the operations of the peripheral devices 106, but also provide the data transmission between the peripheral devices 106, so as to provide a better system management as well as an efficient data backup mechanism.

Since the master controller 100 can directly control the peripheral device 106 having serious power consumption, the master controller 100 needs to effectively control the power consumption of the peripheral device 106. In detail, the master controller 100 utilizes different buses 102 to communicate with one of the peripheral devices 106. First, the master controller 100 actively detects whether the peripheral device 106 is in a normal mode providing normal operations of the peripheral device 106 or an idle mode. If the peripheral device 106 is in the idle mode for a while, the master controller 100 sends a saving power signal to the peripheral device 106, accordingly, to turn off an operational clock source of the peripheral device 106, which means that the peripheral device 106 enters into a saving power mode. Similarly, the master controller 100 can send a waking signal to wake up the peripheral device 106 that is in the saving power mode, so as to restart the operational clock source of the peripheral device 106 and to enter into the normal mode for utilization of the master controller 100.

Figure 2:
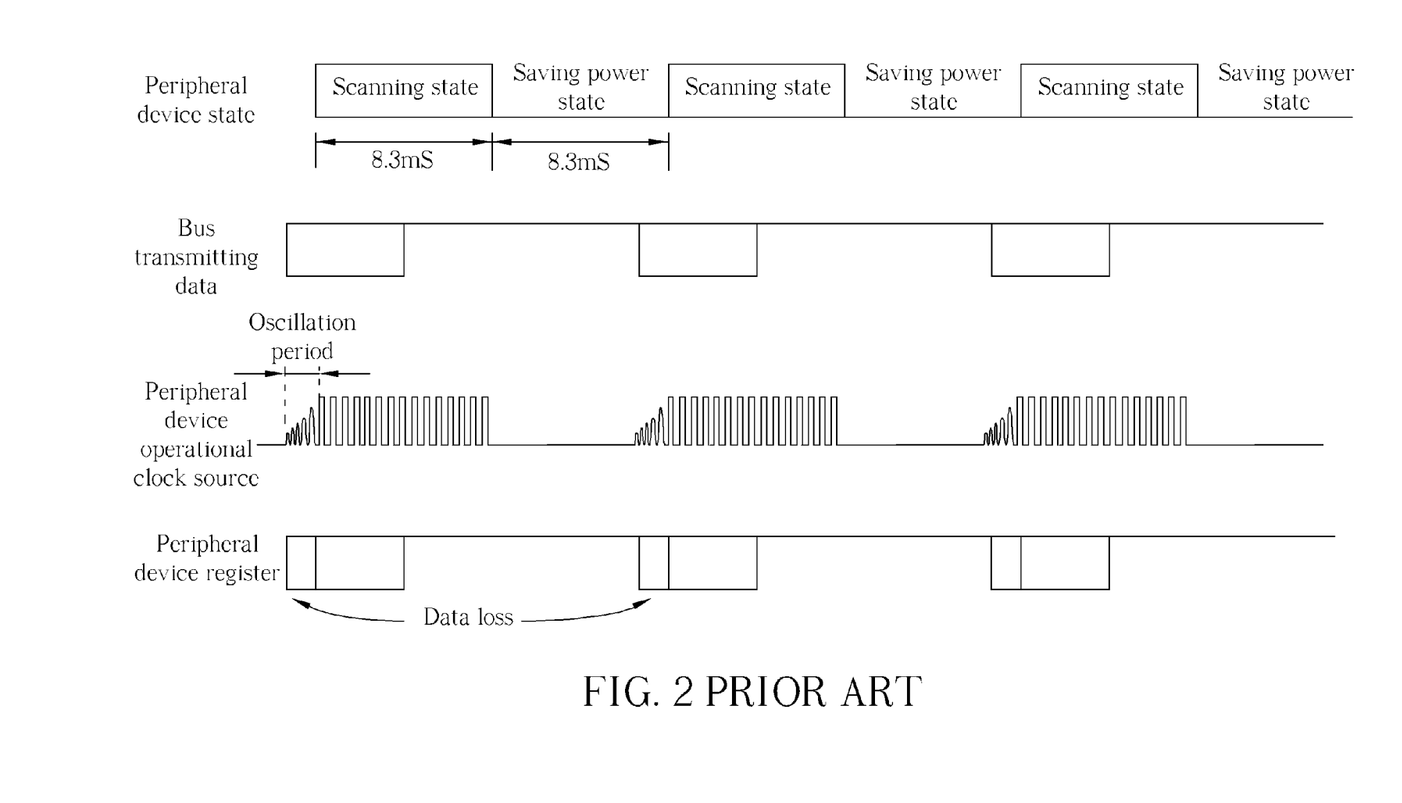
FIG. 2 illustrates a schematic diagram of related signals of the peripheral devices while switching between different operational modes.

Please refer to FIG. 2, which illustrates a schematic diagram of related signals of the peripheral devices 106 while switching between different operational modes. As shown in FIG. 2, the peripheral devices 106 switches between a scanning state for retrieving data and a saving power state, and both states share the same operational period, such as 8.3 microseconds. When the peripheral device 106 is in the saving power state and the master controller 100 tries to utilize the waking signal (not shown in the figure) to restart the operational clock source CLK of the peripheral device 106, the operational clock source needs a period for stabilization. If the master controller 100 tries to communicate with the peripheral device 106 via the bus 102 for the data transmission before oscillations of the operational clock source CLK have stabilized, it has possibility to occur a data transmission loss because.

Therefore, it has become an important issue to provide an effective data transmission method, which provides higher efficiency while transmitting data between the master controller and the peripheral device which either has been in the saving power mode or is ready for entering into the saving power mode.

SUMMARY OF THE INVENTION

It is therefore an objective of the invention to provide a serial interface transmitting method.

The present invention discloses a serial interface transmitting method utilized in a serial interface for connecting between a master controller and a peripheral device, the serial interface transmitting method comprising receiving a saving power signal from the master controller, a peripheral clock source and a serial interface clock source for generating a clock source selection result; switching an operational mode of the peripheral device according to the clock source selection result; and transmitting a datum to a peripheral device register or a serial interface register according to the saving power signal and the operational mode.

The present invention also discloses another peripheral device chip coupled to a master controller to drive a peripheral device via a serial interface, the peripheral device chip comprising a clock source selector for receiving a saving power signal from the master controller, a peripheral clock source and a serial interface clock source for generating a clock source selection result; a controller for switching an operational mode of the peripheral device according to the clock source selection result; and a register selector for transmitting a datum to a peripheral device register or a serial interface register according to the saving power signal and the operational mode.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
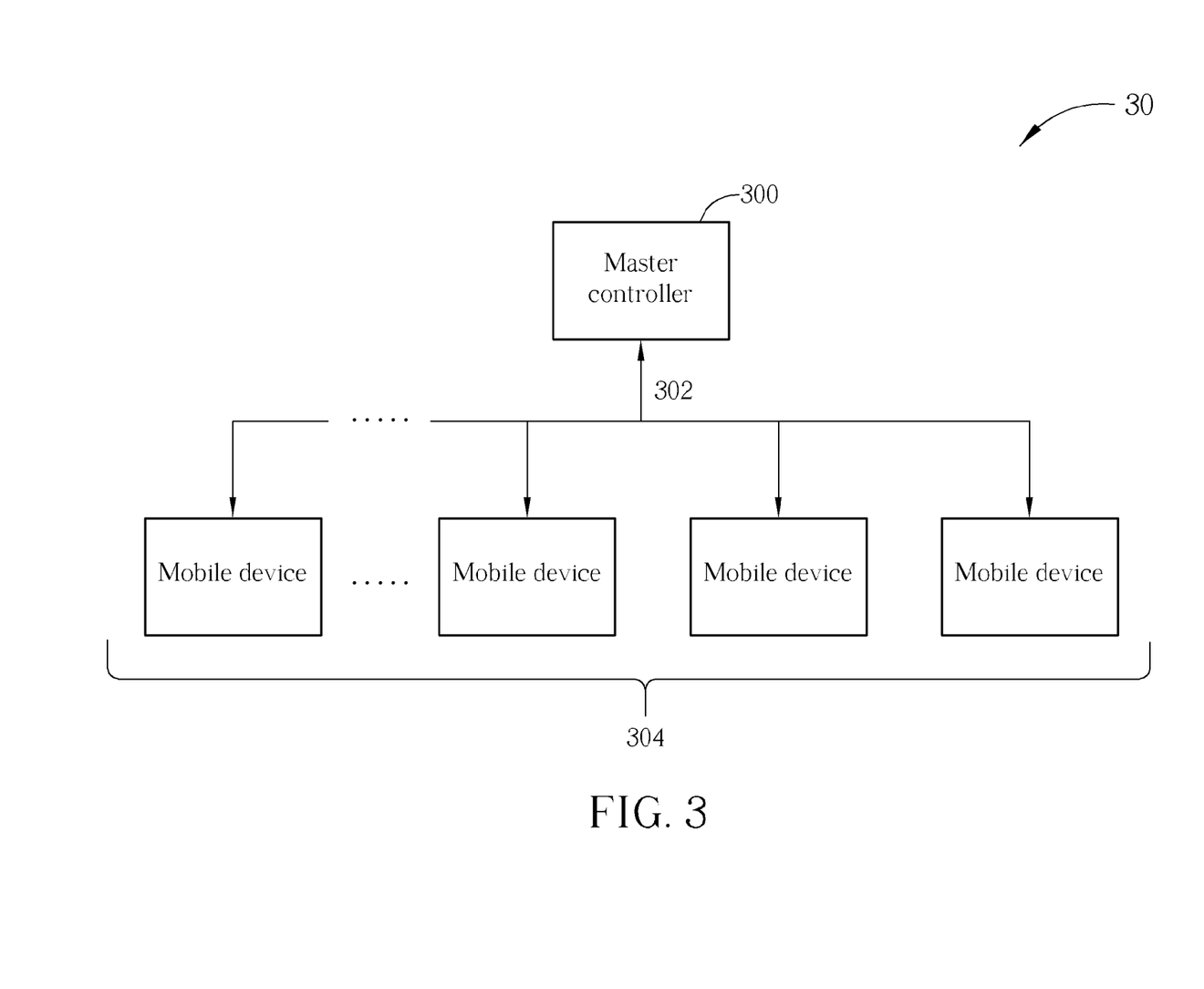
FIG. 3 illustrates a schematic diagram of an electrical system according to an embodiment of the invention.

Please refer to FIG. 3, which illustrates a schematic diagram of an electrical system 30 according to an embodiment of the invention. As shown in FIG. 3, the electrical system 30 includes a master controller 300, a serial interface 302 and at least one peripheral device 304. The master controller 300 can be a personal computer which includes at least a processor, a storage device, an input interface, an output interface and a software/firmware interface, etc. The master controller 300 not only provides users different calculation operations, but also integrates a plurality of peripheral devices 304 simultaneously coupled to the electrical system 30 to process a data transmission or a data backup, so as to set up a personal digital database. In detail, the master controller 300 utilizes the serial interface 302 to connect the plurality of peripheral devices 304. The serial interface 302 can be an inter-integrated circuit ($I^2C$) bus or a serial peripheral interface (SPI) bus to connect between the master controller 300 and the plurality of peripheral devices 304 as a communicational bridge to provide different functions. For example, the master controller 300 accesses a datum of the peripheral device 304, or the master controller 300 controls the peripheral device 304 to switch between different operational modes. The peripheral device 304 can be a tablet device, a mobile device or any electrical product including a simple personal computer functionality. The peripheral device 304 is further driven by a peripheral device chip represented as following.

Figure 4:
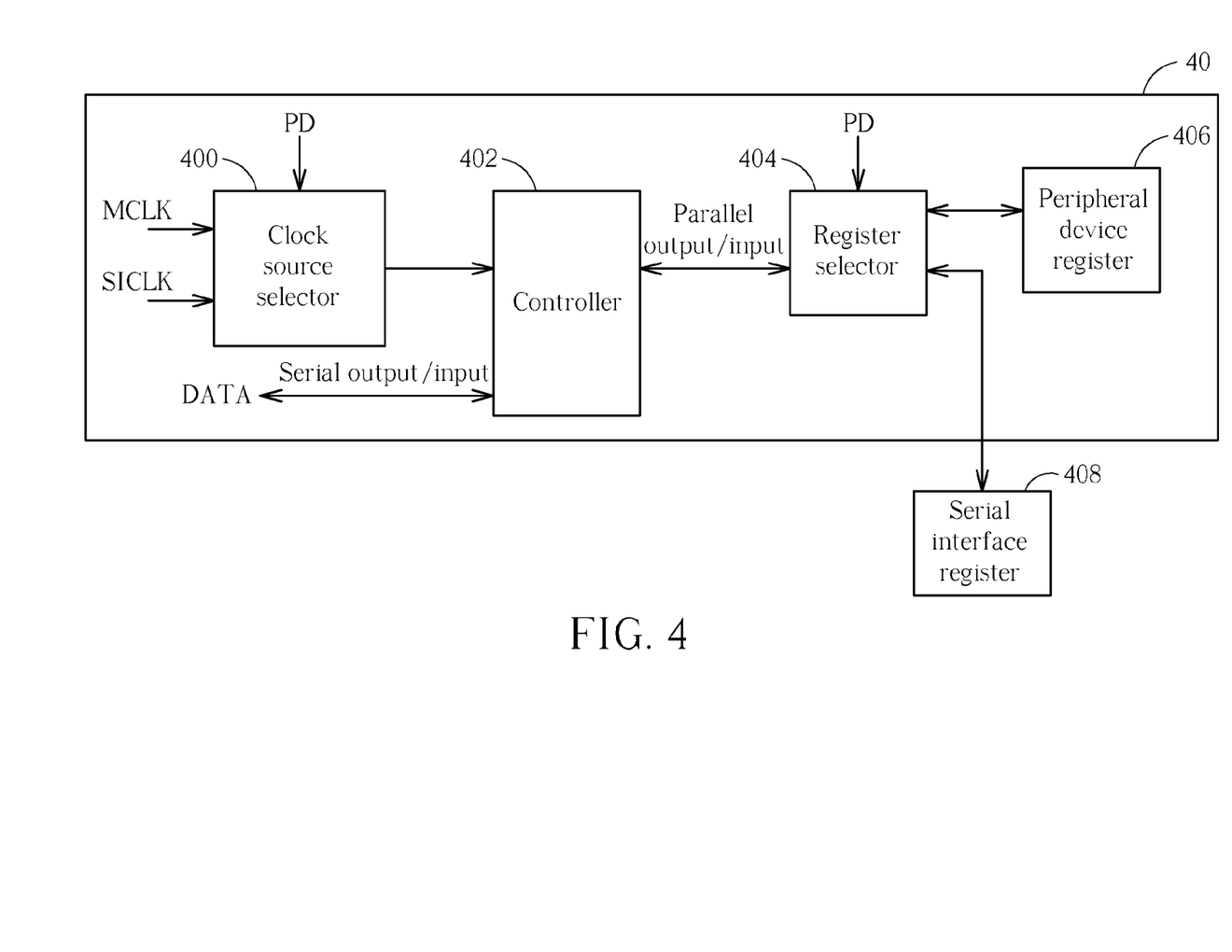
FIG. 4 illustrates a schematic diagram of a peripheral device chip according to an embodiment of the invention.

Please refer to FIG. 3 as well as FIG. 4, wherein FIG. 4 illustrates a schematic diagram of a peripheral device chip 40 according to an embodiment of the invention. As shown in FIG. 4, the peripheral device chip 40 is installed inside the peripheral device 304, and includes a clock source selector 400, a controller 402, a register selector 404 and a peripheral device register 406. Additionally, the peripheral device chip 40 further connects to a serial interface register 408. In detail, the peripheral device chip 40 receives a peripheral clock source MCLK, a serial interface clock source SICLK, a saving power signal PD from the master controller 300 and at least a datum from the master controller 300 or one of the plurality of peripheral devices 304 via the serial interface 302. The clock source selector 400 first receives the peripheral clock source MCLK, the serial interface clock source SICLK and the saving power signal PD of the master controller 300, and determines a clock source selection result to be the peripheral clock source MCLK or the serial interface clock source SICLK according to the saving power signal PD, so as to determine the operational mode of the peripheral device 304 to be either the normal mode or the saving power mode. The controller 402 electrically connects to the clock source selector 400 to receive the clock source selection result and the datum DATA. The controller 402 further includes a decoder to transform a format of the datum DATA, so as to process a storage operation or a calculating operation of the datum DATA. The register selector 404 electrically connects to the controller 402, the peripheral device register 406 and the serial interface register 408 to receive the saving power signal PD and the datum DATA, and determines whether to transmit the datum DATA to the peripheral device register 406 or to the serial interface register 408 according to the saving power signal PD.

Preferably, the peripheral device 304 utilizes the peripheral clock source MCLK to synchronize with a master controller clock source (not shown in the figure) of the master controller 300, which makes sure that the datum DATA is perfectly transmitted without loss. The peripheral device 304 retransmits the datum DATA to the master controller 300 to share or backup the datum DATA via the controller 402 and the serial interface 302. In this embodiment, the datum DATA forms a serial datum format to be transmitted between the master controller 300 and the peripheral device 304. When the datum DATA enters into the peripheral device 304, the datum DATA is stored inside different registers, i.e. the peripheral device register 406 or the serial interface register 408. If the electrical system 30 includes the plurality of peripheral devices 304, each of the plurality of peripheral devices 304 corresponds to a specific code. The master controller 300 searches the specific code to find out the particular one/ones of the plurality of peripheral devices 304, so as to transmit different command signals to the plurality of peripheral devices according to different users' requirements, which helps the master controller 300 accurately transmit the command signals to the plurality of peripheral devices 304. For example, the master controller 300 can transmit the above saving power signal as well as the waking signal (not shown in the figure), to wake up the peripheral device 304 that is in the saving power mode and switch between the operational modes. The master controller 300 also transmits other command signals, which is not described hereinafter because it is not the main emphasis of the invention.

The user can utilize the master controller 300 to change the operational mode of the peripheral device 304, and the peripheral device 304 switches its current operational frequencies to determine the operational mode according to the saving power signal PD or the waking signal. For example, when the peripheral device 304 enters from the normal mode into the saving power mode, the saving power signal PD is changed to a high level. The clock source selector 400 also selects the serial interface clock source SICLK as the operational frequency to drive the peripheral device chip 30, and the register selector 404 correspondingly transmits the received datum DATA into the serial interface register 408. When the peripheral device 304 enters from the saving power mode into the normal mode, the saving power signal PD is changed to a low level. The clock source selector 400 also selects the peripheral clock source MCLK as the operational frequency to drive the peripheral device chip 30, and the register selector 404 correspondingly transmits the received datum DATA into the peripheral device register 406. The detail operations can be understood via the following embodiments, which is not limiting to the scope of the invention.

Figure 5:
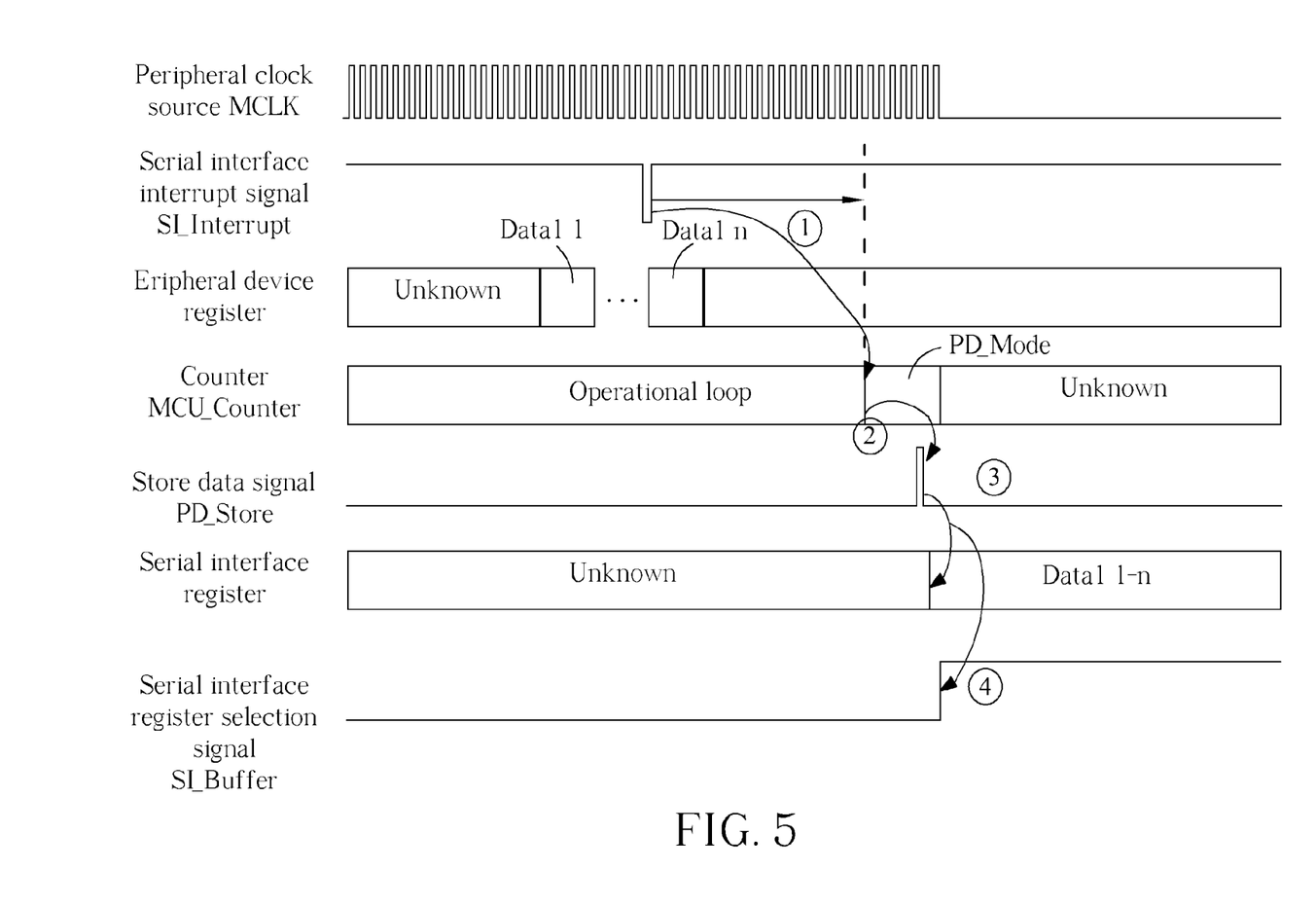
FIG. 5 illustrates a schematic diagram of related signals of the peripheral device while entering from the normal mode into the saving power mode according to an embodiment of the invention.

Please refer to FIG. 5, which illustrates a schematic diagram of related signals of the peripheral device 304 while entering from the normal mode into the saving power mode according to an embodiment of the invention, wherein the saving power signal PD can be realized via combining a plurality of digital signals to achieve the same purpose and is demonstrated as an example hereinafter. As shown in FIG. 5, the master controller 300 utilizes a serial interface interrupt signal SI_Interrupt transformed from a high level into a low level, so as to inform an internal counter MCU_Counter of the peripheral device 304 to enter from a operational loop Main_Loop, which provides normal operations of the peripheral device 304, to a saving power mode PD_Mode for a while. At the same time, a store data signal PD_Store of the peripheral device 304 is triggered as a pulse signal to transmit the data 1-$n$ to the serial interface register 408. A serial interface register selection signal SI_Buffer of the peripheral device 304 is then transformed into the high level to indicate to the master controller 300 that the data 1-$n$ can be directly accessed from the serial interface register 408, and the peripheral device 304 enters into the saving power mode to turn off the peripheral clock source MCLK. Under such circumstances, the peripheral device 304 utilizes the serial interface clock source SICLK instead of the peripheral clock source MCLK as the operational frequency for its internal circuits, which effectively lowers power consumption and transmits the data 1-$n$ to the serial interface register 408 as well. Also, the master controller 300 is confined by the peripheral device 304 which has entered into the saving power mode, and can arbitrarily retrieve the transmitted data 1-$n$ to avoid waking up the peripheral device 304 in advance. If the user tries to transmit a datum to the peripheral device 304, the master controller 300 and the peripheral device 304 can still communicate with each other without data transmission loss, and have no communicational issues while the peripheral device 304 has entered into the saving power mode. Therefore, the embodiment of the invention not only reduces waiting periods of the electrical system 30, but also effectively arranges access of the data, so as to provide the master controller 300 and the peripheral device 304 the effective data transmission.

Figure 6:
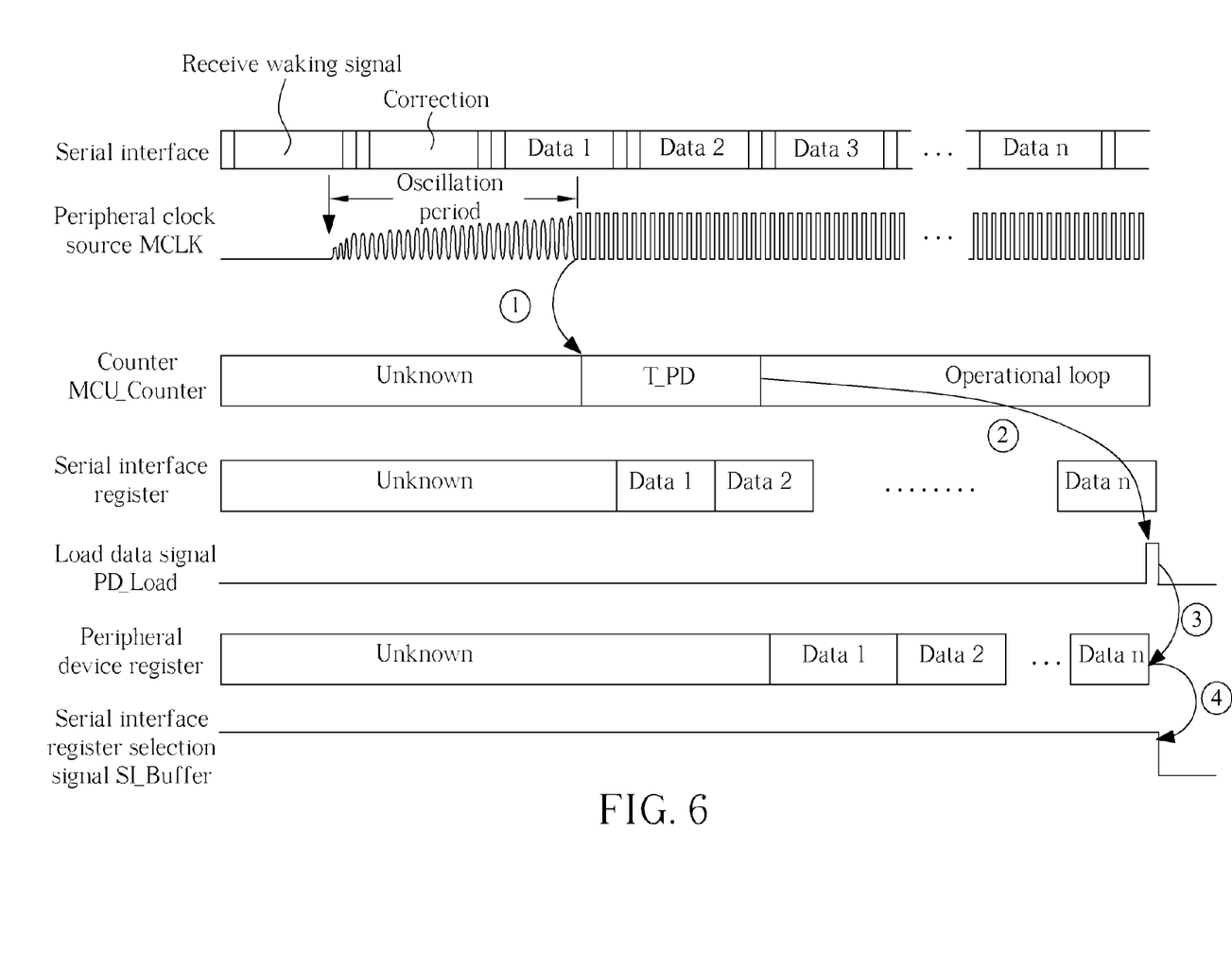
FIG. 6 illustrates a schematic diagram of related signals of the peripheral device while entering from the saving power mode into the normal mode according to an embodiment of the invention.

Please refer to FIG. 6, which illustrates a schematic diagram of related signals of the peripheral device 304 while entering from the saving power mode into the normal mode according to an embodiment of the invention, wherein the saving power signal PD similarly can be realized via combining a plurality of digital signals to achieve the same purpose and is demonstrated as an example hereinafter. As shown in FIG. 6, the peripheral clock source MCLK of the peripheral device 304 is ready to oscillate as a periodical square wave signal when the peripheral device 304 receives the waking signal via the serial interface 302. However, the peripheral clock source MCLK still needs a period for oscillation stabilization. When the peripheral clock source MCLK is the stable periodical square wave signal, the internal counter MCU_Counter of the peripheral device 304 is informed to enter from the idle mode with unknown signals into the saving power mode and continues for a period T_PD, so as to enter into the operational loop Main_Loop. At the same moment, the serial interface register 408 still receives the data 1-$n$ transmitted from the serial interface 302. Until a load data signal PD_Load of the peripheral device 304 is triggered as a pulse signal, which means that the peripheral clock source MCLK is the stable periodical square wave signal after the period T_PD, the peripheral device 406 starts to receive the data 1-$n$, and the serial interface register selection signal SI_Buffer of the peripheral device 304 is lowered to the low level to inform the master controller 300 to directly access the data 1-$n$ inside the peripheral device register 406. Preferably, the serial interface register 408 includes a predetermined space. Although the peripheral clock source MCLK needs to be stable after the period T_PD, the predetermined space provides enough spaces to store the transmitted data 1-$n$. Even if the peripheral device 304 is still in the saving power mode or is entering into the normal mode (i.e. the peripheral clock source MCLK has not yet reached the stabilization), there will be no loss of the transmitted data 1-$n$. Therefore, the embodiment of the invention can effectively determine whom and when to access the data, reduce possible data transmission loss, and enhance communicational efficiency, so as to provide another efficient data transmission between the master controller 300 and the peripheral device 304.

Figure 7:
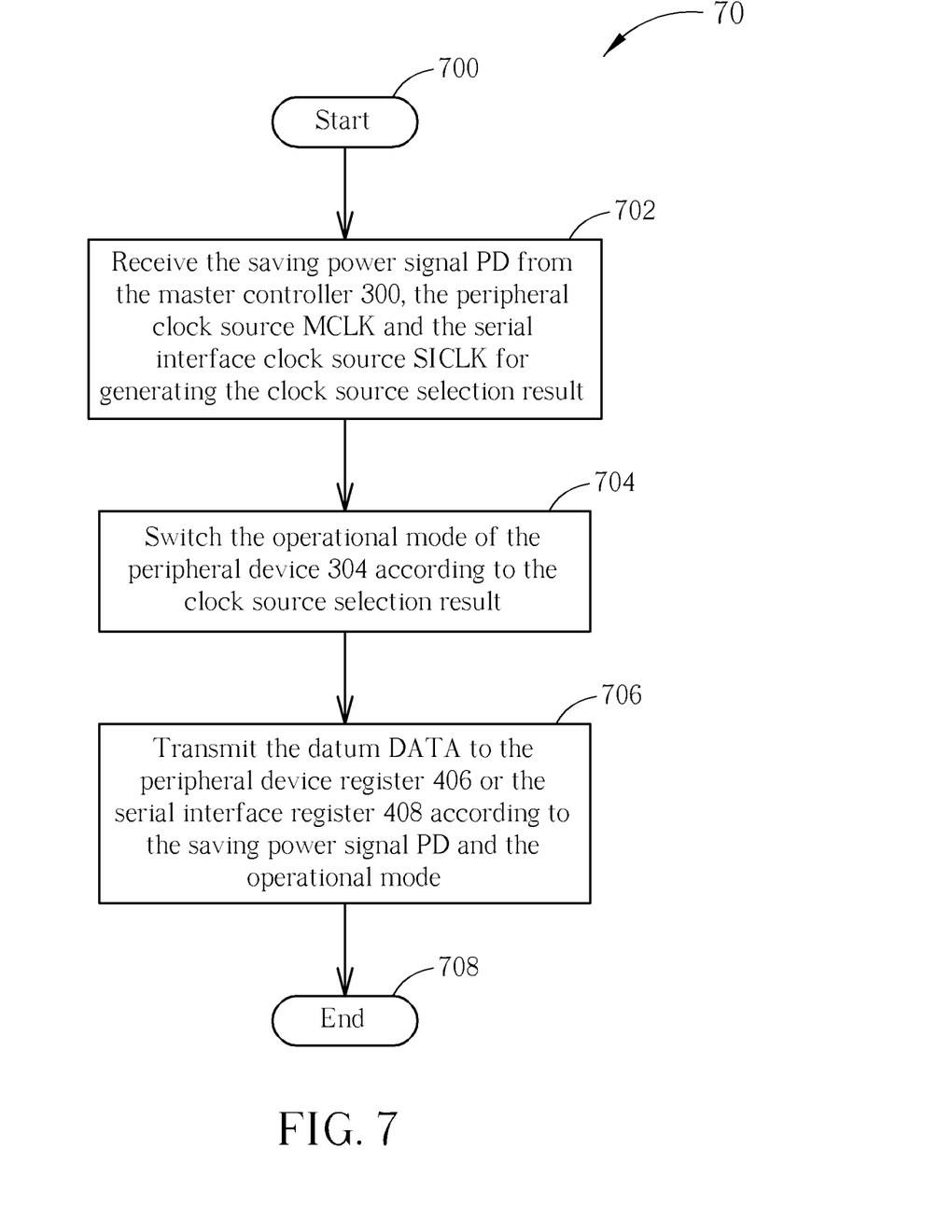
FIG. 7 illustrates a flow chart of a serial interface transmission process according to an embodiment of the invention.

Additionally, operations of the electrical system 30 as well as the peripheral device chip 40 of the invention can be summarized as a serial interface transmission process 70, as shown in FIG. 7. The serial interface transmission process 70 includes the steps as follows:

Step 700: Start.

Step 702: Receive the saving power signal PD from the master controller 300, the peripheral clock source MCLK and the serial interface clock source SICLK for generating the clock source selection result.

Step 704: Switch the operational mode of the peripheral device 304 according to the clock source selection result.

Step 706: Transmit the datum DATA to the peripheral device register 406 or the serial interface register 408 according to the saving power signal PD and the operational mode.

Step 708: End.

Details of each steps of the serial interface transmission process 70 can be understood from descriptions and related figures of the electrical system 30 and the peripheral device chip 40, which is not described hereinafter. Noticeably, in the embodiment, the serial interface transmission process 70 can be further classified into another two operational processes when the peripheral device 304 tries to enter into the saving power mode or into the normal mode, which is represented as following.

Figure 8:
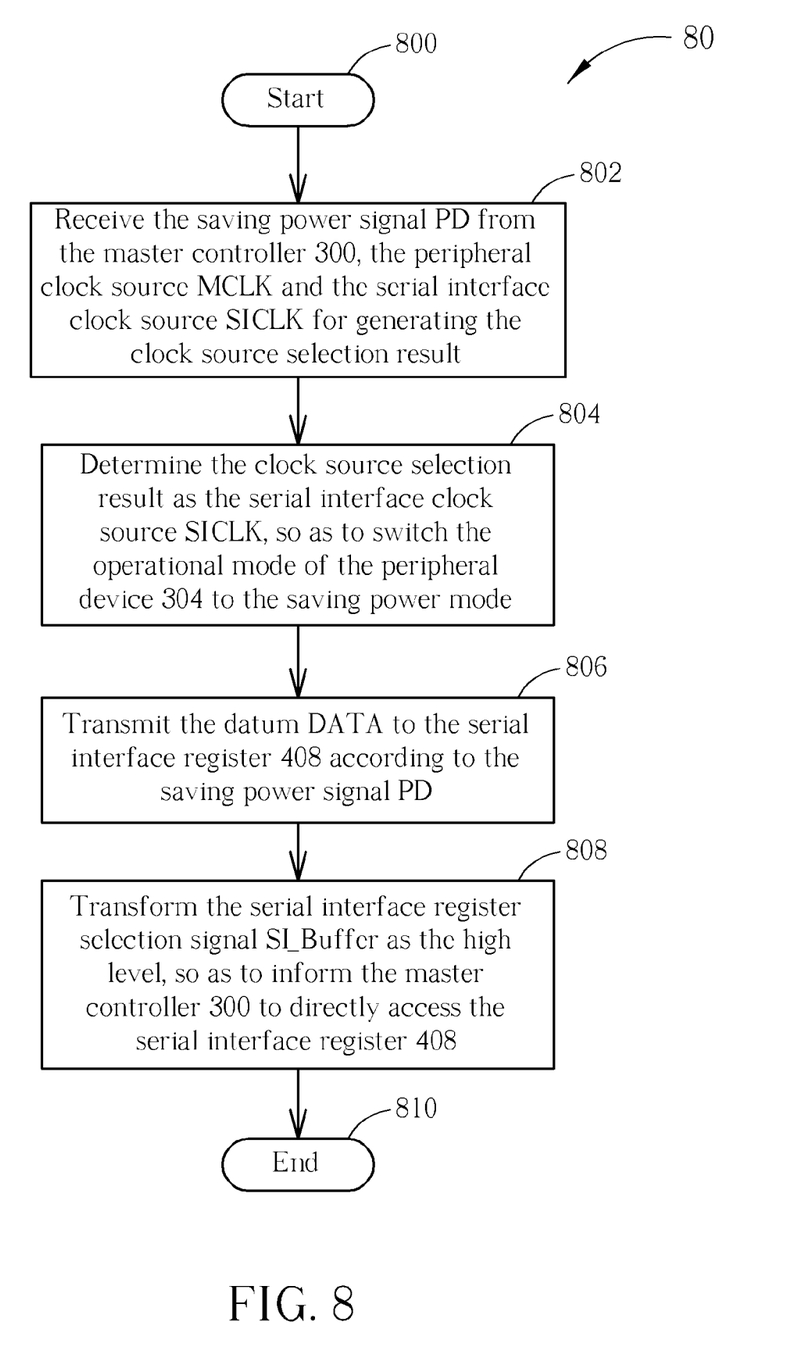
FIG. 8 illustrates a flow chart of an entry saving power mode process according to an embodiment of the invention.

If the peripheral device 304 tries to enter from the normal mode into the saving power mode, it can be summarized as a saving power mode entry process 80, as shown in FIG. 8. The saving power mode entry process 80 includes the steps as follows:

Step 800: Start.

Step 802: Receive the saving power signal PD from the master controller 300, the peripheral clock source MCLK and the serial interface clock source SICLK for generating the clock source selection result.

Step 804: Determine the clock source selection result as the serial interface clock source SICLK, so as to switch the operational mode of the peripheral device 304 to the saving power mode.

Step 806: Transmit the datum DATA to the serial interface register 408 according to the saving power signal PD.

Step 808: Transform the serial interface register selection signal SI_Buffer as the high level, so as to inform the master controller 300 to directly access the serial interface register 408.

Step 810: End.

Figure 9:
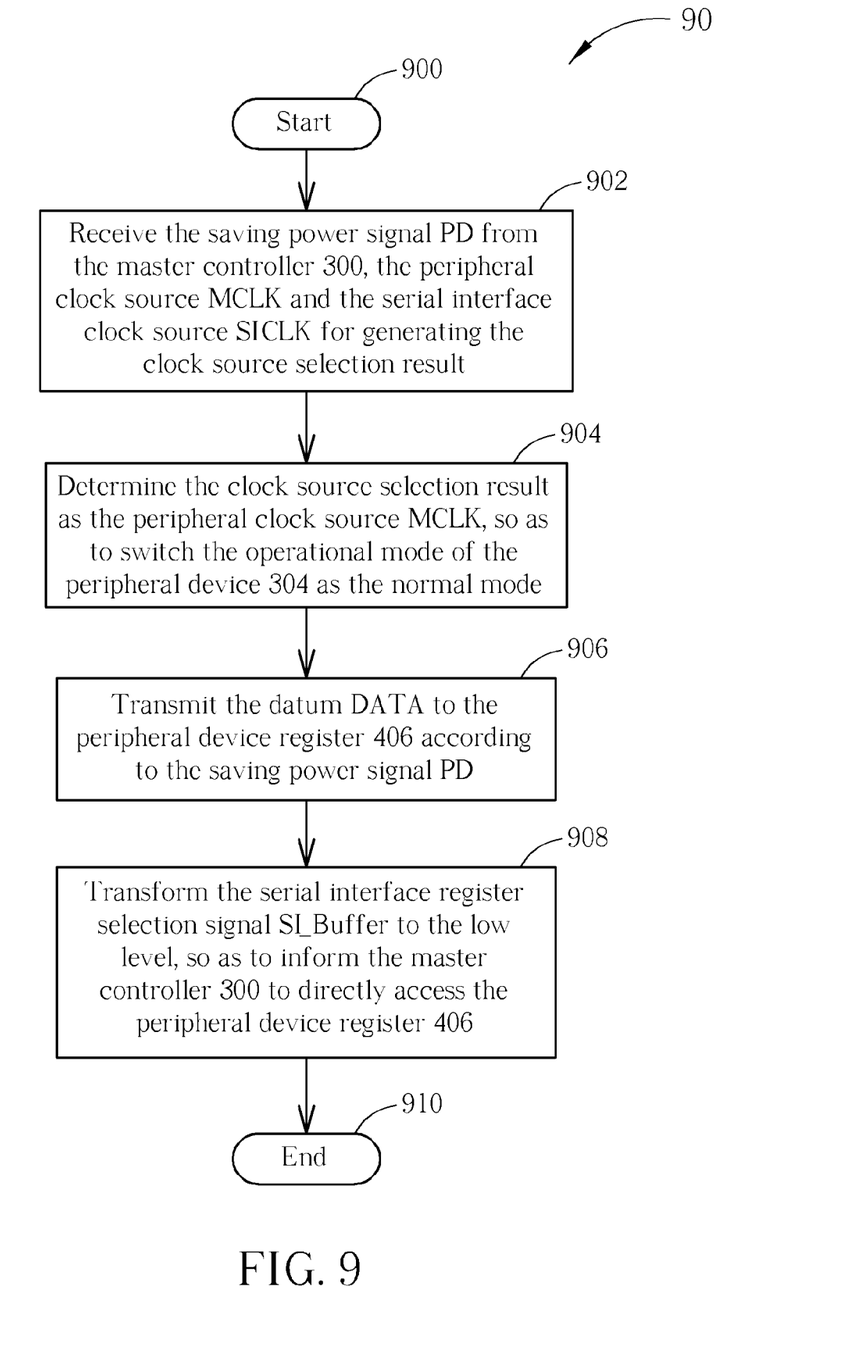
FIG. 9 illustrates a flow chart of an entry normal mode process according to an embodiment of the invention.

If the peripheral device 304 tries to enter from the saving power mode into the normal mode, it can be summarized as an normal mode entry process 90, as shown in FIG. 9. The normal mode entry process 90 includes the steps as follows:

Step 900: Start.

Step 902: Receive the saving power signal PD from the master controller 300, the peripheral clock source MCLK and the serial interface clock source SICLK for generating the clock source selection result.

Step 904: Determine the clock source selection result as the peripheral clock source MCLK, so as to switch the operational mode of the peripheral device 304 as the normal mode.

Step 906: Transmit the datum DATA to the peripheral device register 406 according to the saving power signal PD.

Step 908: Transform the serial interface register selection signal SI_Buffer to the low level, so as to inform the master controller 300 to directly access the peripheral device register 406.

Step 910: End.

Detailed operations of the saving power mode entry process 80 or the normal mode entry process 90 applied to the peripheral device 304 and the master controller 300 can be understood from FIG. 3 to FIG. 7 and related paragraphs thereof, which is not described hereinafter. The serial interface transmission process 70 of the invention particularly focuses on the peripheral device 304 while entering into the saving power mode or into the normal mode, and is demonstrated as an example hereinafter. Those skilled in the art can adaptively modify/change the embodiments of the invention according to practically different requirements. For example, the data can be effectively arranged and randomly accessed by the master controller 300 in advance before the peripheral device 304 tries to switch the operational mode, so as to avoid the data transmission loss while switching the operational mode of the peripheral device 304, which is also in the scope of the invention. Additionally, the transmitted datum can also be the format of either a serial datum or a parallel datum, which is not limited hereinafter.

In summary, the embodiments of the invention provide a serial interface transmitting method applied to a peripheral device chip to control mechanisms of a master controller, at least a serial interface and as least a peripheral device. Utilizing a saving power signal as a reference, operational mode of the peripheral device can be switched between a normal mode and a saving power mode, and predetermined spaces are provided to store transmitted data accordingly. Therefore, the master controller can effectively access the transmitted data without errors, and the data can be shared or backed up between the master controller and the peripheral device. In other words, the invention prevents the peripheral device awaiting stabilization of the oscillating period from data transmission loss, and the master controller can still access the transmitted data when the peripheral device has entered into the saving power mode, which provides users efficient control of power consumption of the peripheral device as well as to hasten data transmission and calculating operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A serial interface transmitting method utilized in a serial interface for connecting between a master controller and a peripheral device, the serial interface transmitting method comprising:
    receiving a saving power signal from the master controller, a peripheral clock source and a serial interface clock source for generating a clock source selection result;
    switching an operational mode of the peripheral device according to the clock source selection result; and
    transmitting a datum to a peripheral device register or a serial interface register according to the saving power signal and the operational mode;
    wherein the datum is transmitted between the master controller, the serial interface and the peripheral device, and the master controller further comprises a master controller clock source to synchronize with the peripheral clock source, and the peripheral device and the master controller exchange the datum while synchronizing.

2. The serial interface transmitting method of claim 1, wherein the peripheral device receives the saving power signal for determining the clock source selection result to be the peripheral clock source and the serial interface clock source.

3. The serial interface transmitting method of claim 1, wherein the operational mode is a saving power mode or a normal mode.

4. The serial interface transmitting method of claim 3, wherein the clock source selection result is the serial interface clock source to transmit the datum to the serial interface register when the operational mode is the saving power mode.

5. The serial interface transmitting method of claim 4, wherein the serial interface register comprises a predetermined space to store the datum.

6. The serial interface transmitting method of claim 3, wherein the clock source selection result is the peripheral clock source to transmit the datum to the peripheral device register when the operational mode is the normal mode.

7. The serial interface transmitting method of claim 1, further comprising utilizing a waking signal to switch the operational mode of the peripheral device.

8. The serial interface transmitting method of claim 7, wherein the peripheral device further comprises a specific code, and the master controller searches the peripheral device according to the specific code, so as to switch the operational mode of the peripheral device.

9. The serial interface transmitting method of claim 8, wherein the master controller transmits the saving power signal and the waking signal to the peripheral device, so as to switch the operational mode of the peripheral device.

10. The serial interface transmitting method of claim 1, wherein the serial interface is an inter-integrated circuit (I2C) bus or a serial peripheral interface (SPI) bus.

11. The serial interface transmitting method of claim 1, further comprising utilizing a decoder for transforming the datum to be a serial datum or a parallel datum.

12. A peripheral device chip coupled to a master controller to drive a peripheral device via a serial interface, the peripheral device chip comprising:
    a clock source selector for receiving a saving power signal from the master controller, a peripheral clock source and a serial interface clock source for generating a clock source selection result;
    a controller for switching an operational mode of the peripheral device according to the clock source selection result; and
    a register selector for transmitting a datum to a peripheral device register or a serial interface register according to the saving power signal and the operational mode;
    wherein the master controller further comprises a master controller clock source to synchronize with the peripheral clock source, and the peripheral device and the master controller exchange the datum while synchronizing.

13. The peripheral device chip of claim 12, wherein the peripheral device receives the saving power signal for determining the clock source selection result to be the peripheral clock source and the serial interface clock source.

14. The peripheral device chip of claim 12, wherein the operational mode is a saving power mode or a normal mode.

15. The peripheral device chip of claim 14, wherein the clock source selection result is the serial interface clock source to transmit the datum to the serial interface register when the operational mode is the saving power mode.

16. The peripheral device chip of claim 15, wherein the serial interface register comprises a predetermined space to store the datum.

17. The peripheral device chip of claim 14, wherein the clock source selection result is the peripheral clock source to transmit the datum to the peripheral device register when the operational mode is the normal mode.

18. The peripheral device chip of claim 12, further comprising a waking signal to switch the operational mode of the peripheral device.

19. The peripheral device chip of claim 18, wherein the peripheral device further comprises a specific code, and the master controller searches the peripheral device according to the specific code, so as to switch the operational mode of the peripheral device.

20. The peripheral device chip of claim 19, wherein the master controller transmits the saving power signal and the waking signal to the peripheral device, so as to switch the operational mode of the peripheral device.

21. The peripheral device chip of claim 12, wherein the serial interface is an inter-integrated circuit (I2C) bus or a serial peripheral interface (SPI) bus.

22. The peripheral device chip of claim 12, wherein the datum is transmitted between the master controller, the serial interface and the peripheral device.

23. The peripheral device chip of claim 12, further comprising a decoder for transforming the datum to be a serial datum or a parallel datum.

* * * * *